Figures 1, 2:
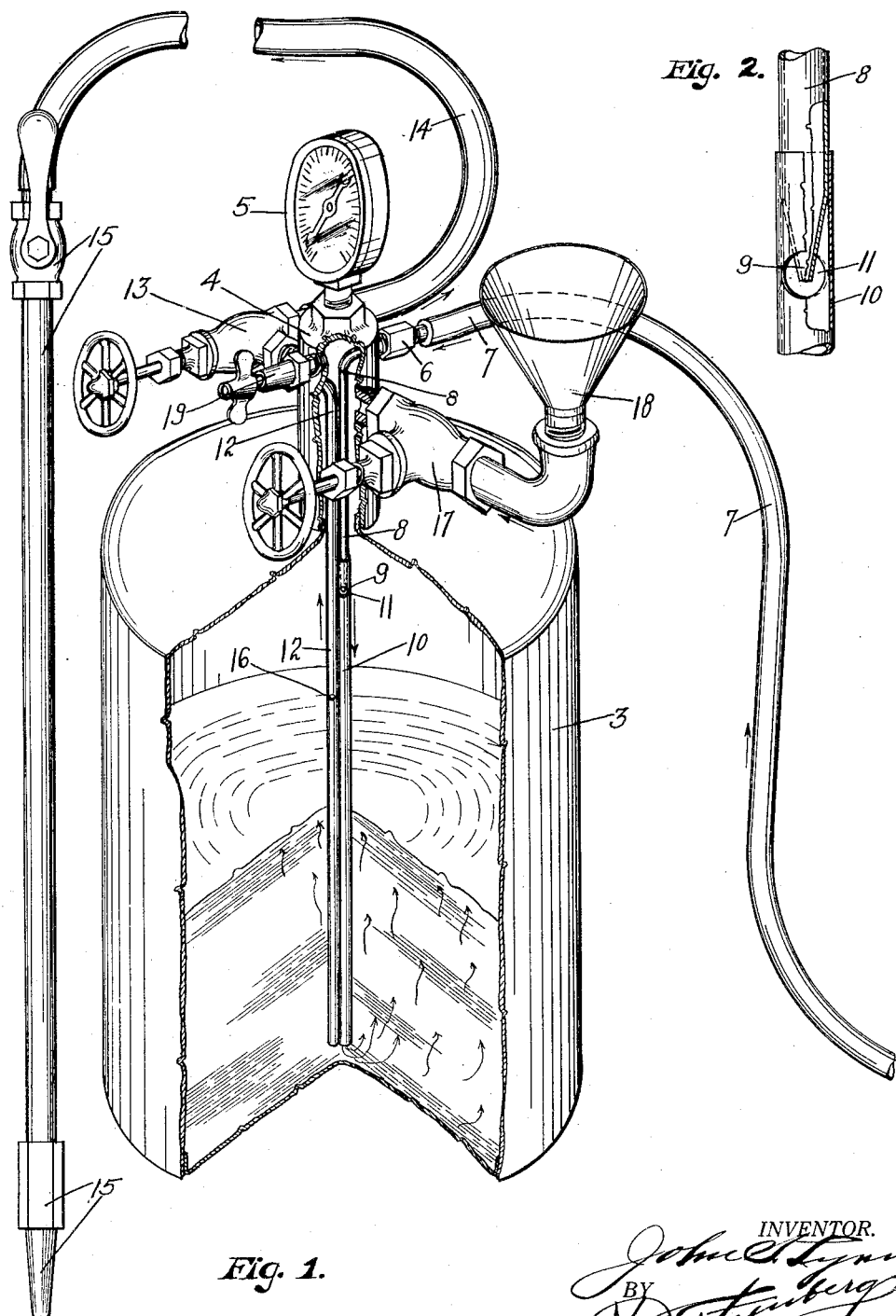

Patented Apr. 1, 1930

1,752,530

UNITED STATES PATENT OFFICE

JOHN S. LYNN, OF LOS ANGELES, CALIFORNIA, ASSIGNOR TO THE VESUVIUS CORPORATION, OF LOS ANGELES, CALIFORNIA

PRESSURE-LUBRICATING APPARATUS

Application filed April 2, 1928. Serial No. 266,644.

My invention relates to pressure lubricating apparatus of the type used for forcing lubricant under air pressure into joints and other interfitting places in which squeaks develop, and it has among its salient objects to provide an apparatus which can be connected up with the compressed air system of a service station and be ready for use at all times without danger of any of the lubricant from said apparatus being forced into the compressed air system and so as to be discharged into tires, or air-operated devices should the air pressure be allowed for any reason to be reduced below the pressure in the lubricating apparatus. Another object of my invention is to provide a device in which air under pressure is discharged through a small orifice through a pipe having inlet around said orifice or associated therewith so that the force of said small jet of air entrains surrounding air and delivers through said pipe a blast of air sufficient to thoroughly stir and churn the lubricant in the bottom of the container therefor, thus thoroughly mixing and preparing said lubricant for discharge through a delivery nozzle to the place to be treated.

In order to explain my invention, I have illustrated the same on the accompanying sheet of drawings, in which:

Figure 1 is a perspective view of a pressure lubricating apparatus embodying my invention, with a part of the container broken out and parts shown in section; and Figure 2 is an enlarged detail showing the discharge nozzle for discharging a small jet of air under high pressure into a pipe having means for the admission of surrounding air to be entrained and carried through said pipe under force.

Referring in detail to the drawings, 3 designates a container for lubricant, 4 a head opening into or closing the top of said container, said head having a pressure gauge 5 connected therewith to indicate pressure in the container. A connection 6 is provided to one side of said head for connecting a supply pipe 7 for air under pressure, with a small pipe 8 leading from said connection 6, and terminating in a small discharge nozzle 9, within a larger pipe 10, Fig. 2, with an inlet opening 11, near said discharge nozzle, whereby air forced from said nozzle 9, entrains or draws in surrounding air and forces it through the pipe 10.

A discharge pipe 12, for the lubricant, extends alongside of the pipe 10, and is preferably secured thereto, said pipe 12 extends out through the head 4, and connects with an outlet control valve 13, with which is connected a service hose 14, provided with a service nozzle 15. Said pipe 12 is provided through its side with an opening 16, and it is open at its lower end, so that as lubricant is forced up into said pipe 12 by the pressure within said container, air under pressure is being forced through said opening 16, and acts on said lubricant and forces it out through the service pipe 14, and the service nozzle 15 in a very fine, penetrating spray.

A valve 17 is also connected with said head 4, and a funnel 18 is shown connected therewith for supplying lubricant to said container, as may be needed.

A small vent valve 19 is also shown connected with said head 4.

It is common in apparatus of this character for the lubricant, such as graphite, to settle in the bottom of the container and the usual air jet is not sufficient to stir it up and thoroughly mix the graphite or other matter with the liquid part thereof, and many different devices have been used but with no real success. I have discovered, however, that by discharging the air under pressure from the air storage tank or reservoir of an air system through a small restricted nozzle or orifice, as at 9, and providing a surrounding inlet for the surrounding air to be drawn in or entrained by said small air jet under force, a great volume of air is thus carried into the bottom of the container through said pipe 10, and with sufficient force to thoroughly churn the contents and mix the lubricating mixture.

Another important feature of my invention is that the provision of the inlet at 11, in the pipe 10, admits sufficient pressure into said pipe 10 to prevent the liquid from rising therein and at the same time permits air in the top part of said container 3, to escape through said small nozzle 9, without any of the lubricant passing out therewith. This is important for the reason that when the pressure is reduced in the air system of the service station, the pressure in the container 3, being connected into said system, must also be reduced and if the air cannot escape without carrying with it the lubricant, said lubricant will be carried out into the air system and will get into the storage tank and then be discharged into tires and other air-operated devices, as has actually occurred. This arrangement of the discharge nozzle 9, with surrounding air inlet to the same pipe, makes it possible for air to escape out from the top of the container through said small orifice at 9, without entraining liquid from the pipe 10, and this is true for the reason that the pressure is also operating down in said larger pipe 10 and prevents the liquid from rising in said pipe 10, as it would do if there were simply a small opening through the side of the pipe 10, above the liquid, and no small nozzle 9, or pipe 8, that is, if said pipe 10 were simply extended out through the connection 6, and provided with a small hole at 11. That arrangement has been tried and fails to work, but permits back flow of liquid when the outside pressure in the system is reduced below the pressure in the container for the lubricant.

I have shown and described one practical and successful embodiment of my invention for purposes of illustration, but I do not limit my invention to the details thus shown, except as I may be limited by the hereto appended claims.

I claim:

1. In a pressure lubricating apparatus, a container for lubricant, means for connecting a source of air under pressure to said container, a pipe for said air within said container and terminating near the bottom thereof, said pipe having an inlet opening therein above the liquid level, a nozzle for discharging air under pressure into said pipe near said inlet opening whereby surrounding air is entrained through said inlet opening by the force of said air discharged through said nozzle, an outlet pipe from said liquid out through said container, said outlet pipe being open at its lower end and having an opening through its side above said liquid, and a service pipe and nozzle connected with said outlet pipe.

2. A lubricating apparatus including a container for fluid lubricant, a nozzle for discharging air under pressure into said container above the fluid level, a pipe in said container open above the fluid level and into which said nozzle discharges, the force of said discharge entraining air from the upper part of said container to and through said pipe, said pipe discharging into the bottom of said container into the fluid therein, an outlet pipe from the bottom of said container through its upper part for said fluid, and a service pipe and nozzle connected with said outlet pipe.

3. A lubricating apparatus including a closed container for fluid lubricant, a pipe extended into said container for discharging a jet of air under pressure thereinto above the fluid level, a continuation of said pipe opening into the upper part of said container at one end and at the bottom of said container in said fluid, said jet of air under pressure being discharged into said pipe above the fluid level to entrain air from the upper part of said container through said pipe to the bottom of said container, an outlet pipe from the container and open at its lower end near the bottom thereof, said outlet pipe having an opening in its side above the fluid level, and a service pipe and nozzle connected with the outlet pipe.

4. A lubricating apparatus including a closed container for fluid lubricant, a unitary device for supplying air under pressure to said container and for discharging fluid lubricant therefrom said device including an attaching head to be attached to said container and having a pipe therethrough discharging in the upper part of said container and an extension pipe open to receive the discharge from said pipe, whereby the force of said discharge entrains air from the upper part of said container into said pipe, and an outlet pipe from said container through said head and open in lower part of said container in said fluid.

5. In combination, a closed container for fluid mixture, means for agitating the mixture in said container including a pipe extended thereinto to discharge a jet of air under pressure above the fluid level, a pipe extended into the bottom of said container through said fluid mixture and having its upper end open adjacent said first pipe to receive said forced air jet whereby air in the upper part of said container is entrained by said air jet into said pipe and discharged in the bottom of said container for agitating said fluid mixture, and outlet means from said container for said fluid mixture.

6. In combination, a closed receptacle for fluid mixture, a pipe extended into said container and to the bottom thereof for discharging air under pressure into the fluid mixture, said pipe being open above the fluid level and at the opening the pipe above said opening being adapted to discharge an air jet under force across said opening to entrain air from the upper part of said container into said opening and through said pipe to the bottom of said container, and an outlet pipe from the container open at its lower end near the bottom of said container and extended out of the upper part thereof.

7. In an apparatus of the character described, a container, a head closing said container, a pipe extended through said head to the bottom of said container for discharging air under pressure into the bottom of said container, said pipe including therein above the fluid level a discharge nozzle and being open near the discharge nozzle, said discharge nozzle discharging into said pipe near said opening whereby the force of the discharge entrains air from the upper part of the container into and through said pipe to the bottom of said container, an outlet pipe from near the bottom of said container through said head, and valve means for controlling the inlet and outlet from said container, substantially as described.

Signed at Los Angeles, Los Angeles County, California, this 27th day of March, 1928.

JOHN S. LYNN.